(12) United States Patent
Lee et al.

(10) Patent No.: US 9,853,871 B2
(45) Date of Patent: Dec. 26, 2017

(54) DYNAMIC COLLABORATION SERVICE PLATFORM AND METHOD FOR PROVIDING AN APPLICATION SERVICE AT THE SAME PLATFORM

(71) Applicant: Electronics and Telecommunications Research Institute, Daejeon (KR)

(72) Inventors: Hoon-Ki Lee, Daejeon (KR); Jong-Hyun Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 171 days.

(21) Appl. No.: 14/728,087

(22) Filed: Jun. 2, 2015

(65) Prior Publication Data
US 2015/0365302 A1 Dec. 17, 2015

(30) Foreign Application Priority Data

Jun. 16, 2014 (KR) ........................ 10-2014-0073124

(51) Int. Cl.
| | |
|---|---|
| *G06F 15/16* | (2006.01) |
| *H04L 12/24* | (2006.01) |
| *H04L 29/08* | (2006.01) |
| *G06F 9/455* | (2006.01) |
| *H04L 29/06* | (2006.01) |

(52) U.S. Cl.
CPC ...... *H04L 41/5054* (2013.01); *G06F 9/45504* (2013.01); *H04L 67/10* (2013.01); *H04L 67/16* (2013.01); *H04L 67/38* (2013.01)

(58) Field of Classification Search
CPC ..... H04L 41/5054; H04L 67/10; H04L 67/16; H04L 67/38; G06F 9/45504
See application file for complete search history.

(56) References Cited

U.S. PATENT DOCUMENTS

| | | | | |
|---|---|---|---|---|
| 2008/0228865 | A1* | 9/2008 | Cruzada | H04L 67/10 |
| | | | | 709/203 |
| 2010/0125798 | A1* | 5/2010 | Brookhart | G06F 17/3089 |
| | | | | 715/752 |
| 2012/0069131 | A1* | 3/2012 | Abelow | G06Q 10/067 |
| | | | | 348/14.01 |
| 2013/0166966 | A1 | 6/2013 | Keum et al. | |

(Continued)

FOREIGN PATENT DOCUMENTS

| | | | | |
|---|---|---|---|---|
| EP | 12186744 | * | 9/2012 | ............. H04N 7/157 |
| KR | 1020100129488 A | | 12/2010 | |

(Continued)

*Primary Examiner* — Richard G Keehn
(74) *Attorney, Agent, or Firm* — William Park & Associates Ltd.

(57) ABSTRACT

Exemplary embodiments relate to an apparatus and a method for providing a dynamic collaboration service. A dynamic collaboration service platform according to one embodiment may include a collaboration managing module configured to collect and manage a plurality of unit services required for collaboration to analyze application service specification related to an application service and provide the application service based on the analyzed result; a service operating module configured to install and operate the collected plurality of unit services; and an execution engine configured to provide a virtual machine for executing the plurality of unit services.

14 Claims, 6 Drawing Sheets

(56) References Cited

U.S. PATENT DOCUMENTS

| | | | |
|---|---|---|---|
| 2013/0246513 A1* | 9/2013 | Zaveri | G06F 3/067 |
| | | | 709/203 |
| 2014/0082091 A1* | 3/2014 | Rexer | G06F 17/3089 |
| | | | 709/205 |
| 2014/0118471 A1* | 5/2014 | Guo | H04N 7/155 |
| | | | 348/14.09 |
| 2014/0176663 A1* | 6/2014 | Cutler | H04N 7/142 |
| | | | 348/14.07 |
| 2014/0188585 A1* | 7/2014 | Thompson, Jr. | G06Q 30/0214 |
| | | | 705/14.16 |
| 2015/0134600 A1* | 5/2015 | Eisner | G06F 17/30011 |
| | | | 707/608 |
| 2015/0244987 A1* | 8/2015 | Delegue | H04N 7/157 |
| | | | 348/14.09 |

FOREIGN PATENT DOCUMENTS

| | | |
|---|---|---|
| KR | 1020120110936 A | 10/2012 |
| KR | 1020130075252 A1 | 7/2013 |

\* cited by examiner

DYNAMIC COLLABORATION SERVICE PLATFORM AND METHOD FOR PROVIDING AN APPLICATION SERVICE AT THE SAME PLATFORM

CROSS-REFERENCE TO RELATED APPLICATIONS

This application claims the benefit of Korean Patent Application No. 10-2014-0073124, filed on Jun. 16, 2014, entitled "Dynamic collaboration service platform and Method for providing an application service at the same platform", which is hereby incorporated by reference in its entirety into this application.

BACKGROUND

1. Technical Field

Exemplary embodiments relate to a dynamic collaboration service, and particularly to an apparatus and a method for providing collaboration service by dynamically downloading resources such as service logic and resources information (device information, service execution environment information and the like).

2. Background Art

In order to provide various types of application services to a user, service logic (hereinafter referred to as 'service') and/or resource information required to provide each application service is usually pre-installed and executed in a platform. In such circumstances, when a service is changed, it should be re-installed in the platform. Since most of services or resource information should reflect user's requirements, more improved peripheral equipment and execution environment, it causes inconvenience for a service provider or developer to access a platform in order to re-install or distribute a new service. A service provided by a service provider or developer can be executed not only in one platform but also in platforms of other provider's. Thus, when a service is changed, each platform should be also changed. Recent application services with improved functions are provided in dynamic collaborations with various types of services and are also provided by immediately reflecting peripheral environment factors.

Accordingly, a method for dynamically managing resources is highly demanded for service providers or developers to reflect immediate peripheral environment factors and to provide dynamic collaboration.

SUMMARY

Exemplary embodiments of the present invention relate to an apparatus and a method for dynamically providing a collaboration service by downloading services or resource information through internet in a platform (or server) at the time when the collaboration service is required.

According to an embodiment, a dynamic collaboration service platform may include a collaboration managing module configured to collect and manage a plurality of unit services required for collaboration to analyze application service specification related to an application service and provide the application service based on the analyzed result; a service operating module configured to install and operate the collected plurality of unit services; and an execution engine configured to provide a virtual machine for executing the plurality of unit services.

In an embodiment, the platform may further include a storage device configured to store the application service specification, the plurality of unit services required for the collaboration and service specification related to each thereof.

In an embodiment, wherein the collaboration managing module includes: a specification analysis submodule configured to analyze the application service specification and identify the plurality of unit services and relation information between unit services; and a service search submodule configured to search for the plurality of unit services in the platform and search for a unit service which is not present in the platform through internet.

In an embodiment, the service search submodule is further configured to connect a service location manager through internet to identify location of the unit service which is not present in the platform and download the unit service.

In an embodiment, the service location manager receives and manages manifest and service location information of the unit service from a service developer.

In an embodiment, wherein the service operating module includes: a service management submodule configured to manage resources and environment information needed for execution of each unit service installed in the platform; and a life cycle management submodule configured to manage each life cycle of the plurality of unit services installed in the platform.

According to an embodiment of the present invention, there is provided a computer-implemented method for providing a dynamic collaboration service. The method may include: analyzing application service specification related to an application service; searching for a plurality of unit services needed for the dynamic collaboration in the platform based on the analyzed result; searching for a unit service which is not searched in the platform and downloading the unit service through internet; and installing and executing the plurality of unit services.

In an embodiment, the analyzing of application service specification includes analyzing the application service specification and identifying the plurality of unit services and relation information between unit services.

In an embodiment, the method may further include: identifying operation status of the unit service searched in the platform; determining possibility of multiprocessing of the unit service when the unit service is executed by another application service; and duplicating the unit service when multiprocessing is not possible.

In an embodiment, the searching of the unit service includes: identifying location of the unit service by connecting to a service location manager through internet; and downloading the unit service at the identified location.

In an embodiment, the method may further include: unpacking when the downloaded unit service is a packed service; determining whether an additional unit service is needed to execute the service by identifying service specification of the unpacked service; and searching and downloading the unit service which is determined to be needed.

In an embodiment the installing and executing of the plurality of unit services includes: identifying an attribute value based on manifest for each of the plurality of unit services; storing a unit service which is determined to be installable and manageable in the platform based on the identified attribute value; and installing and executing the stored unit service using an execution engine.

In an embodiment, the method may further include managing life cycle of the executed unit service.

In an embodiment, the installing and executing of the plurality of unit services includes: identifying operation status of each of the plurality of unit services; determining possibility of multiprocessing of the unit service when there is any unit service which is already being executed; duplicating the unit service when multiprocessing is not possible; and changing attribute information of the duplicated unit service when the duplicated unit service is needed to share a resource with the unit service which is already being executed.

According to the embodiments of the present invention, services or resources information can be dynamically downloaded and executed at the time when collaboration of services is needed to provide various types of application services, so that the resources can be efficiently used since it does not require to have all resources needed for providing application services in the platform (or server). In addition, service providers or developers can easily provide improved services through internet.

DESCRIPTION OF THE EXEMPLARY EMBODIMENTS

While the present invention has been described with reference to particular embodiments, it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted.

Unless clearly used otherwise, expressions in the singular number include a plural meaning such as "at least one".

In the present description, expressions such as "module", "unit", "interface" and the like generally mean computer-related objects such as hardware, software and its combination.

In the present description, an expression of "service" means a service logic that processes control signals or data.

Figure 1:
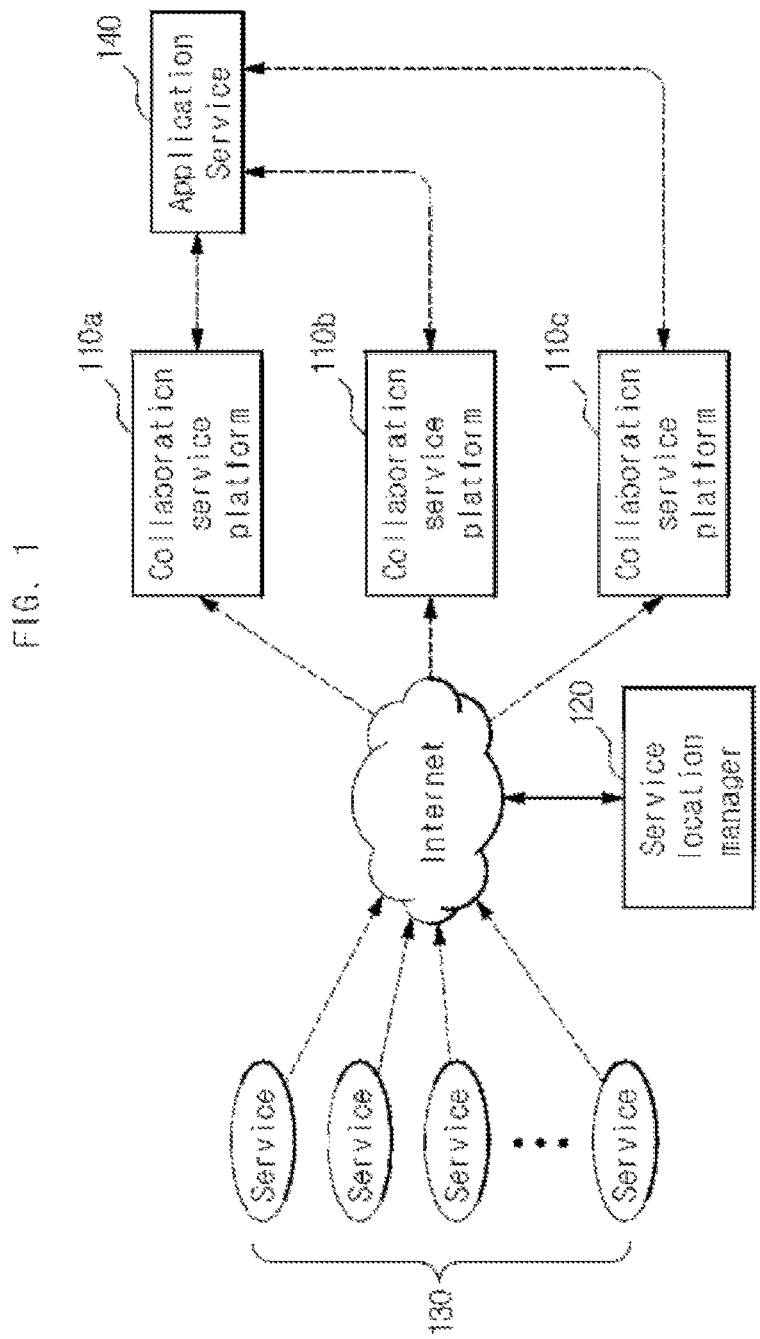
FIG. 1 illustrates a process for providing an application service needed for dynamic collaboration according to an embodiment of the present invention.

FIG. 1 illustrates a process for providing an application service needed for dynamic collaboration according to an embodiment of the present invention.

In an embodiment, a dynamic collaboration service platform (110a to 110c, referred to as "platform") provides an application service to a user by collaboration of various types of unit services (or service logics), which are provided by the same or different providers. It is apparent to those who are skilled in the art that a platform can be implemented in a general computer system, which is equipped with various hardware components such as a processor, a memory, a user interface, an input/output unit, a communication unit and the like.

The collaboration service platform 110a to 110c analyzes service specification related to an application service 140, identifies at least one unit service to be required, and determines whether it is present in the platform 110a to 110c, when a user requests for the application service 140. The platform 110a to 110c searches for at least one unit service 130 by connecting to a service location manager 120 through internet and downloads the service 130 when it is not present in the platform 110a to 110c. The platform 110a to 110c can unpack a packed unit service downloaded through the internet, if necessary, analyzes manifest information of the downloaded unit service, and determines whether another unit service is needed. The platform 110a to 110c installs the necessary unit services in an execution environment of the platform and executes them to provide the application service, which is requested by a user.

A developer/provider who provides the unit service 130 registers its manifest and location information in the service location manager 120, so that services needed from the collaboration service platform can be searched and downloaded later.

Figure 2:
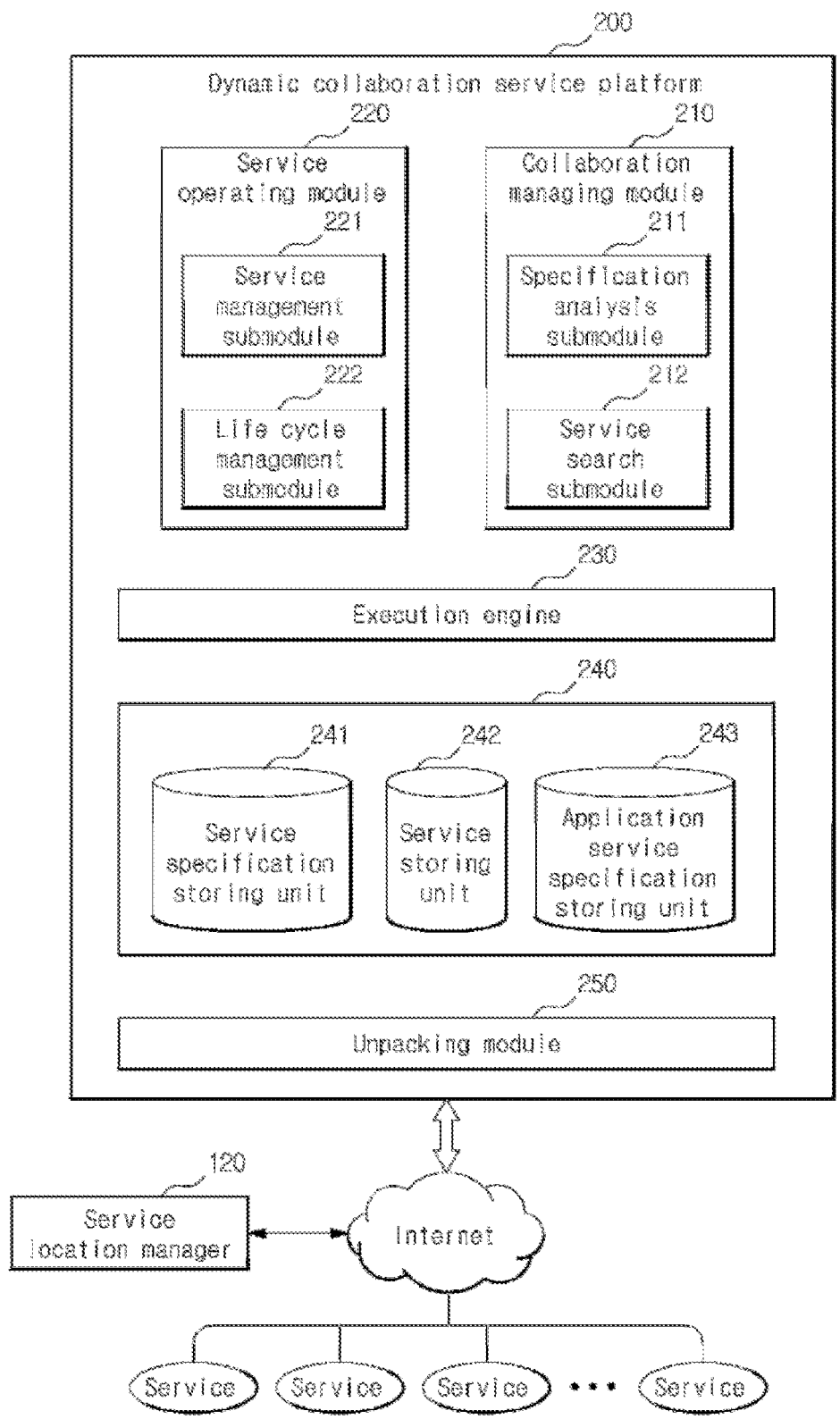
FIG. 2 is a block diagram illustrating an apparatus for providing a dynamic collaboration service according to an embodiment of the present invention.

FIG. 2 is a block diagram illustrating an apparatus for providing a dynamic collaboration service according to an embodiment of the present invention. As shown in FIG. 2, a dynamic collaboration service platform (referred to as 'platform', 200) may include a collaboration managing module 210, a service operating module 220, an execution engine 230, a storage device 240 and an unpacking module 250.

The collaboration managing module 210 analyzes application service specification related to an application service and collects and manages a plurality of unit services required for collaboration to provide an application service based on the analyzed result.

In an embodiment, the collaboration managing module 210 may include a specification analysis submodule 211 and a service search submodule 212.

The specification analysis submodule 211 analyzes application service specification and identifies a plurality of unit services required for collaboration to provide an application service and relation information between unit services.

The service search submodule 212 may search for unit services required for collaboration in a platform and search for a unit service which is not present in the platform through internet. In an embodiment, the service search submodule 212 may identify location of the unit service of which a service is not present in the platform by connecting to a service location manager 120 through internet and download the unit service at the identified location. The service location manager 120 receives and analyzes service specification to be searched from the service search submodule 212 and transmits a list of the same or similar services.

The service operating module 220 installs unit services required for collaboration to provide an application service and performs managing functions. In an embodiment, the service operating module 220 may include a service management submodule 221 and a life cycle management submodule 222.

In an embodiment, the service management submodule 221 manages resources and environment information required for execution of the unit service installed in the platform. One unit service may be operated by being overlapped as a unit service required for several application services. For this purpose, the service management submodule 221 may operate resources and interoperability for services.

The life cycle management submodule 222 manages life cycles of unit services installed in the platform. The life cycle management submodule 222 may set and manage life cycle of each service representing a drivable period for efficient use of platform resources since platform resources are allocated to execute services installed in the platform.

The execution engine 230 provides a virtual machine executing the installed services for an application service.

The storage device 240 may include a service specification storing unit 241 storing service specifications, a service storing unit 242 storing services, and an application service specification storing unit 243 storing application service specifications. In an embodiment, the service specification may provide information needed to select a service using input data and output data.

The unpacking module 250 performs unpacking when the unit service, downloaded by the service search submodule 212, is a packed service.

Figure 3:
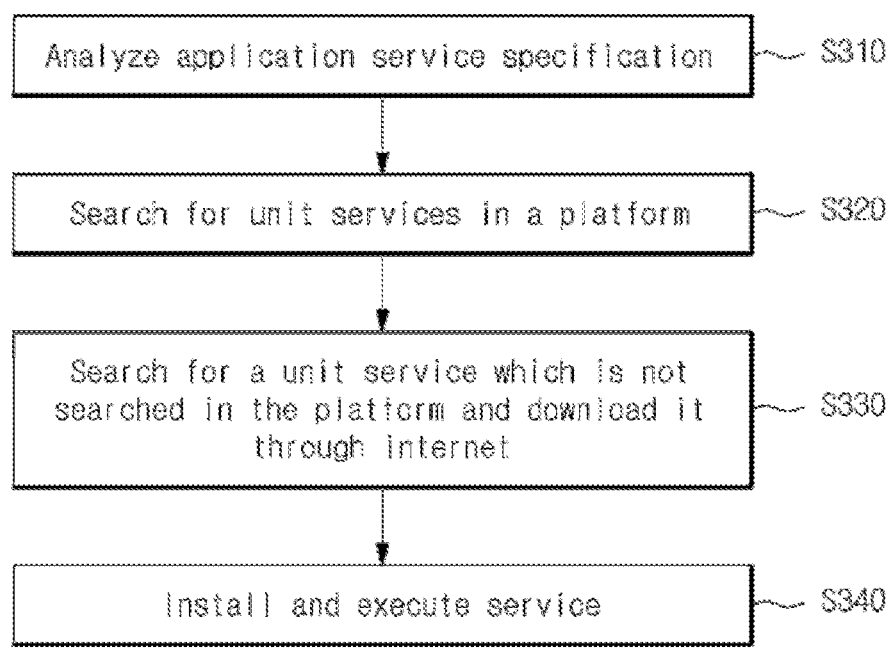
FIG. 3 is a flow diagram illustrating a method for providing an application service in a dynamic collaboration service platform according to an embodiment of the present invention.

FIG. 3 is a flow diagram illustrating a method for providing an application service in a dynamic collaboration service platform according to an embodiment of the present invention.

As shown in FIG. 3, a method for providing a dynamic collaboration service according to an embodiment of the present invention may include analyzing application service specification related to an application service (S310), searching a plurality of unit services required for collaboration in a platform based on the analyzed result (S320), searching and downloading a unit service which is not searched in the platform through internet (S330), and installing and executing a plurality of services needed for the application service (S340). Each process will be described in detail by referring to FIGS. 4 to 6.

Figure 4:
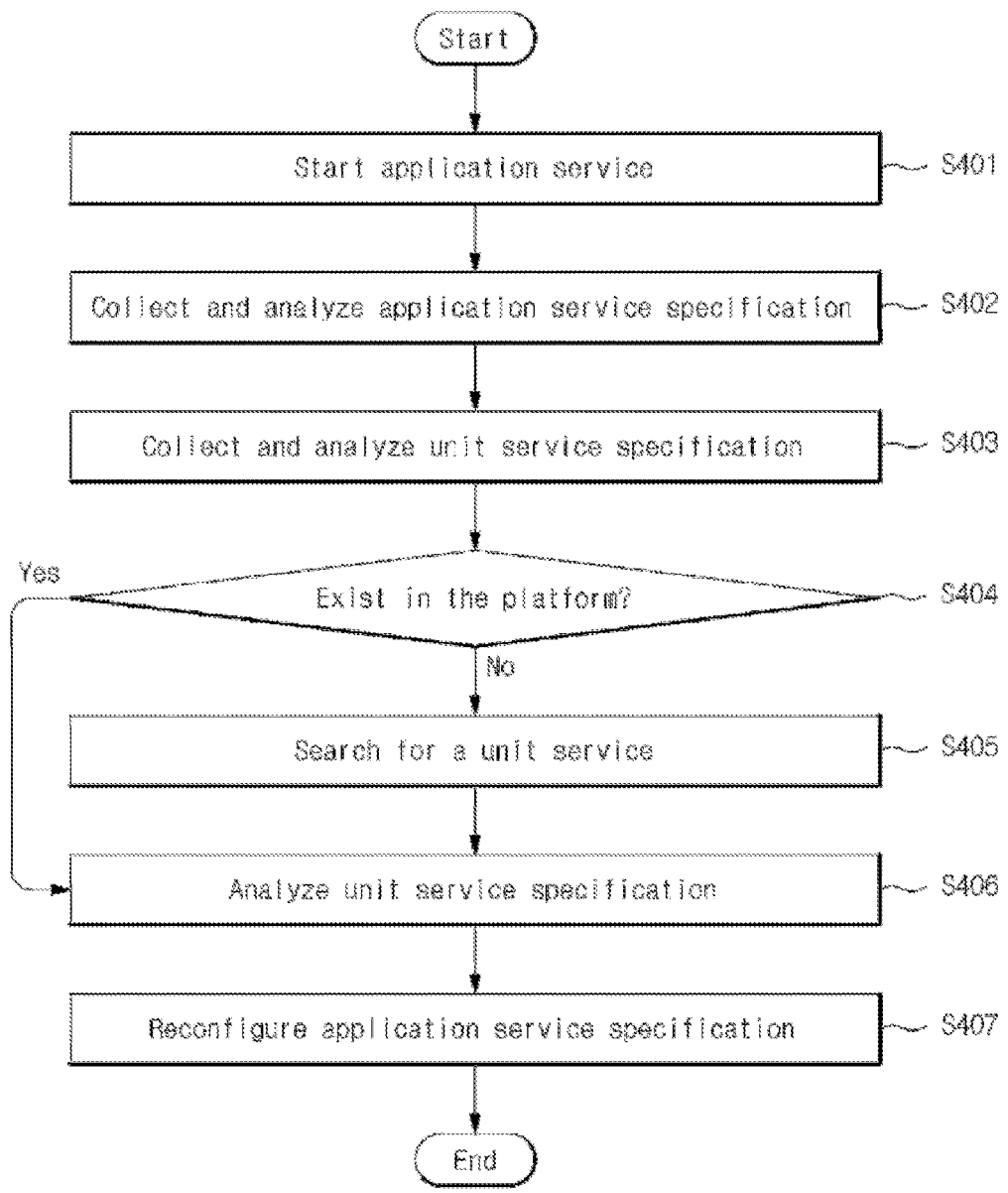
FIG. 4 is a flow diagram illustrating a process for analyzing application service specification by a dynamic collaboration service platform according to an embodiment of the present invention.

FIG. 4 is a flow diagram illustrating a process for analyzing application service specification by a dynamic collaboration service platform according to an embodiment of the present invention.

When an application service is started in S401, application service specification of an application service is analyzed in S402. In an embodiment, the application service specification may include service logic needed for providing the application service, relation information therebetween and data information. In S403, specification of each of the plurality of unit services, which are required for collaboration to provide the application service through the analyzed result, is collected and analyzed. The collaboration service platform can be used as data to determine an appropriate service needed for the application service by collecting several unit services which perform similar functions and analyze service specifications relating to the services. When a unit service which is not present in the collaboration service platform is found in S404 during the process of collecting unit services needed for providing the application service, corresponding services are searched through a service location manager (S405) and service specifications received as the searched result are analyzed (S406).

When it is noted that the corresponding service is changed from the analysis of the service specifications of unit services required for collaboration to provide the application service, an application service specification can be changed to reflect the changed service (S407).

Figure 5:
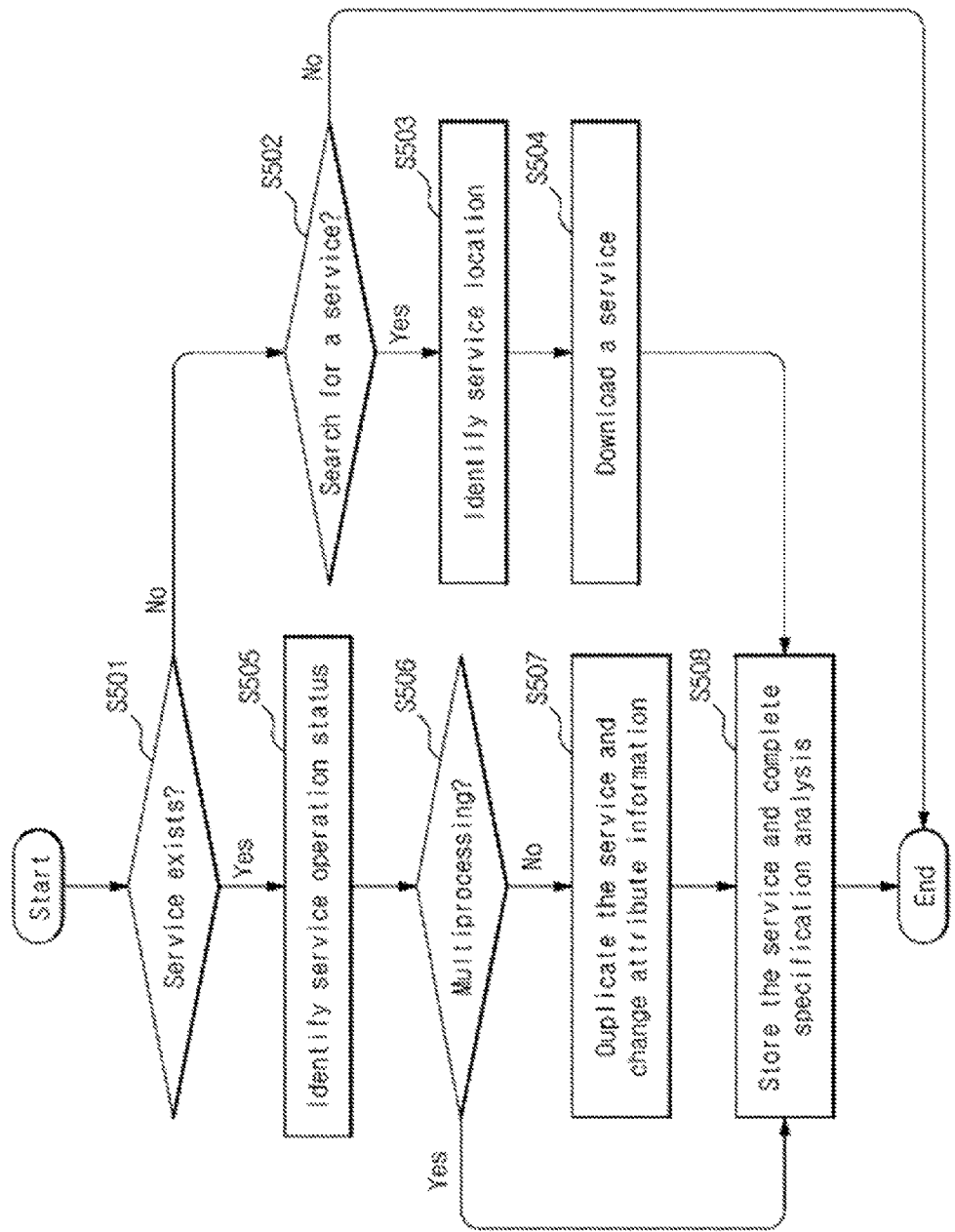
FIG. 5 is a flow diagram illustrating a process for searching and downloading a unit service by a dynamic collaboration service platform according to an embodiment of the present invention.

FIG. 5 is a flow diagram illustrating a process for searching and downloading a unit service by a dynamic collaboration service platform according to an embodiment of the present invention.

As described above, it is determined whether services needed for collaboration exist in the collaboration service platform by analyzing application service specifications (S501) and when at least one service among the services is not provided in the platform, it is determined whether there is a service list related to the service by searching through the service location manager (S502). When there is no the service list, it ends service search and downloading by recognizing that the normal application service cannot be provided.

On the other hand, when the service exists while searching through the service location manager, its location is identified (S503). The service is downloaded by accessing the service location (S504).

When the service exists in the collaboration service platform, service operation status is determined (S505). In an embodiment, it determines whether the service can be normally operated or desired data can be processed based on the service specification. If the service is being executed to provide another application service, it determines possibility of multiprocessing of the corresponding service (S506). When the service is possible for multiprocessing, the service is not required for any additional change, while when the service is not possible for multiprocessing, the service is duplicated to provide the same service (S507). When a resource (for example, network port, etc.) of the dynamic collaboration service platform is needed to be shared, attribute information can be changed in order to avoid conflict. The service for collaboration and the final analyzed specification are stored (S508).

Figure 6:
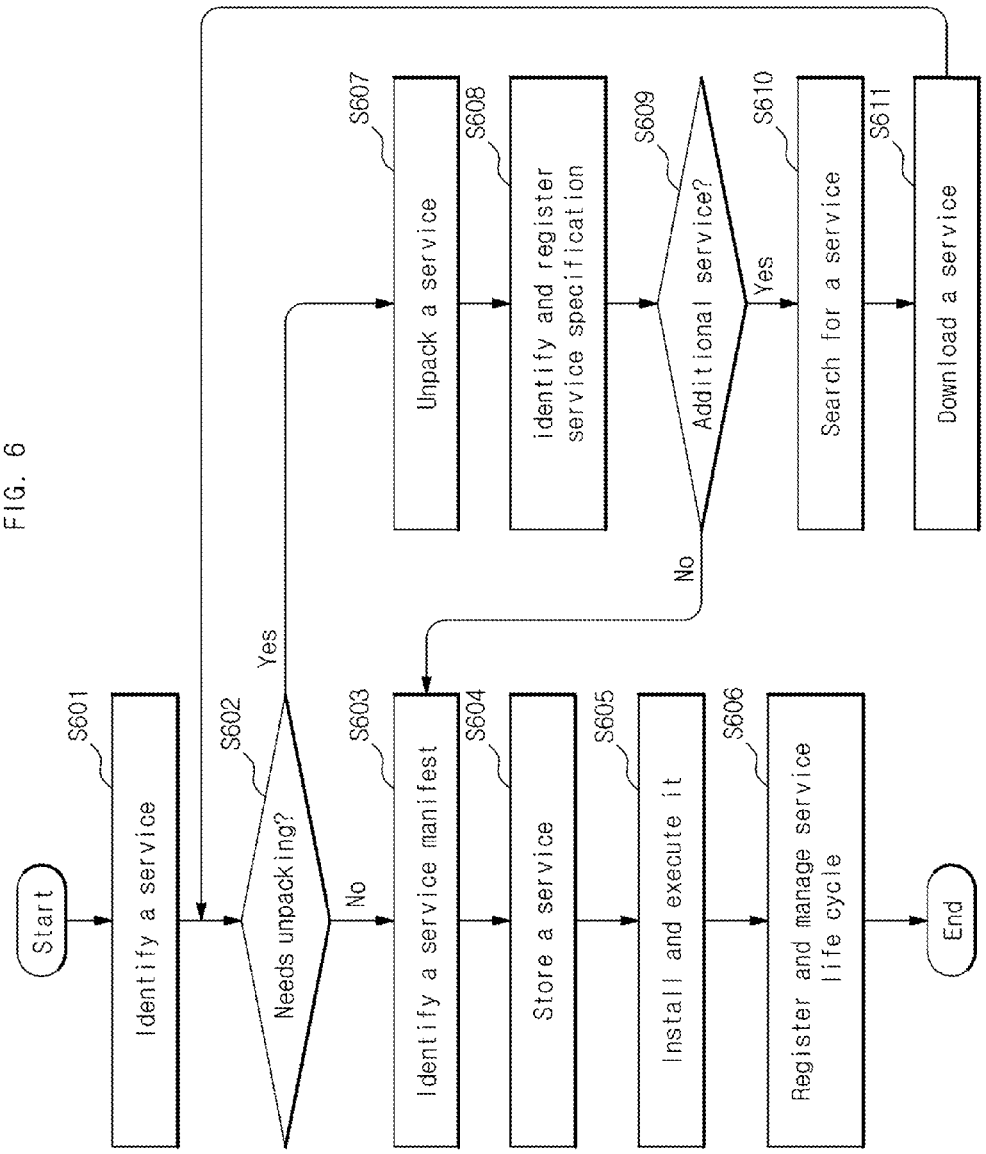
FIG. 6 is a flow diagram illustrating a process for installing and executing a unit service by a dynamic collaboration service platform according to an embodiment of the present invention.

FIG. 6 is a flow diagram illustrating a process for installing and executing a unit service by a dynamic collaboration service platform according to an embodiment of the present invention.

It is determined whether the service downloaded through the service location manager is a normally packed service (S601). It is determined whether the service needs unpacking (S602). If yes, it is unpacked (S607). Installable service and the specification of the service are registered (S608). It is determined whether any additional service is needed to execute the unpacked service by analyzing the service specification (S609). If the additional service is not needed, an attribute value of the service is identified through manifest of each service (S603). When the attribute value of the service is identified and the service can be installed and operated normally, the service is then stored (S604).

When the additional service is needed to execute the unpacked service and the service does not exist in the collaboration service platform, the service is searched (S610) and downloaded (S611) through the service location manager and the unpacking process may be repeated (S607 to S609).

After each service attribute value is identified and stored, the service is installed through an execution engine and executed in an execution area of the collaboration service platform (S605). When the service is installed and executed normally, service life cycle is registered for managing each service and managed for normal operation (S606).

The apparatus and method according to some embodiments of the present invention may be recorded in a computer readable medium by being implemented by any language among various appropriate programming languages which can be performed through various computer means.

The computer readable medium can include program instructions, data files, data structures and the like alone or in a combination.

The program instructions recorded in the computer readable medium can be specially designed for the present invention or available to those who are skilled in the computer software field. An example of the computer readable recording media includes magnetic recording media such as hard disks, floppy disks and magnetic tapes, optical media such as CD-ROMs and DVDs, magneto-optical media such as floptical disks and hardware devices such as a ROM, a RAM, a flash memory and the like which are configured to store and perform program instructions. The above-mentioned medium may be a transmission medium such as optical or metallic lines and waveguides including a carrier which transmits signals to assign program instructions, data structures and the like. An example of the program instruction may include not only machine-language codes which are made by a compiler but also high-level language codes which are executable by a device such as a computer processing information electronically by using an interpreter and the like.

The hardware devices above mentioned may be configured to perform operations of the present invention as one or more software modules and vice versa.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. A dynamic collaboration service server comprising at least one processor; and
   a memory storing instructions configured to instruct the at least one processor to perform:
   collecting and managing a plurality of unit services required for collaboration to analyze application service specification related to an application service and provide the application service based on the analyzed result;
   installing and operating the collected plurality of unit services; and
   providing a virtual machine for executing the plurality of unit services,
   wherein the collecting and managing a plurality of unit services comprises:
   searching for the plurality of unit services in the dynamic collaboration service server and searching for a unit service which is not present in the dynamic collaboration service server through internet.

2. The dynamic collaboration service server of claim 1, further comprising a storage device configured to store the application service specification, the plurality of unit services required for the collaboration and service specification related to each thereof.

3. The dynamic collaboration service server of claim 1, wherein the collecting and managing a plurality of unit services further comprises:
   analyzing the application service specification and identifying the plurality of unit services and relation information between unit services.

4. The dynamic collaboration service server of claim 3, wherein the searching for the plurality of unit services further comprises connecting a service location management server through internet to identify location of the unit service which is not present in the dynamic collaboration service and downloading the unit service.

5. The dynamic collaboration service server of claim 4, wherein the service location management server receives and manages manifest and service location information of the unit service from a service developer.

6. The dynamic collaboration service server of claim 1, wherein the installing and operating the collected plurality of unit services comprises:
   managing resources and environment information needed for execution of each unit service installed in the dynamic collaboration service server; and
   managing each life cycle of the plurality of unit services installed in the dynamic collaboration service server.

7. A computer-implemented method for providing dynamic collaboration services in a dynamic collaboration service server, the method comprising:
   collecting and managing a plurality of unit services required for collaboration to analyze application service specification related to an application service and provide the application service based on the analyzed result;
   installing and operating the collected plurality of unit services; and
   providing a virtual machine for executing the plurality of unit services,
   wherein the collecting and managing a plurality of unit services comprises:
   searching for the plurality of unit services in the dynamic collaboration service server and searching for a unit service which is not present in the dynamic collaboration service server through internet.

8. The method of claim 7, wherein the wherein the collecting and managing a plurality of unit services further comprises:
   analyzing the application service specification and identifying the plurality of unit services and relation information between unit services.

9. The method of claim 7, further comprising:
   identifying operation status of the unit service searched in the dynamic collaboration service server;
   determining possibility of multiprocessing of the unit service when the unit service is executed by another application service; and
   duplicating the unit service when multiprocessing is not possible.

10. The method of claim 7, wherein the searching for the plurality of unit services further comprises connecting a service location management server through internet to identify location of the unit service which is not present in the dynamic collaboration service server and downloading the unit service.

11. The method of claim 10, further comprising:
    unpacking when the downloaded unit service is a packed service;
    determining whether an additional unit service is needed to execute the service by identifying service specification of the unpacked service; and
    searching and downloading the unit service which is determined to be needed.

12. The method of claim 7, wherein the installing and operating the collected plurality of unit services:

identifying an attribute value based on manifest for each of the plurality of unit services;

storing a unit service which is determined to be installable and manageable in the dynamic collaboration service server based on the identified attribute value; and installing and executing the stored unit service using an execution engine.

13. The method of claim 12, further comprising managing life cycle of the executed unit service.

14. The method of claim 7, wherein the installing and operating the collected plurality of unit services includes:

identifying operation status of each of the plurality of unit services;

determining possibility of multiprocessing of the unit service when there is any unit service which is already being executed;

duplicating the unit service when multiprocessing is not possible; and changing attribute information of the duplicated unit service when the duplicated unit service is needed to share a resource with the unit service which is already being executed.

\* \* \* \* \*